United States Patent

[11] 3,633,276

[72] Inventor: Dayle D. Winnie, Kiel, Wis.
[21] Appl. No.: 8,109
[22] Filed: Jan. 21, 1970
[45] Patented: Jan. 11, 1972
[73] Assignee: Stoelting Brothers Company, Kiel, Wis.
Original application Aug. 1, 1968, Ser. No. 749,365, now Patent No. 3,518,760, dated July 7, 1970. Divided and this application Jan. 21, 1970, Ser. No. 8,109

[54] CHEESE CHEDDARING METHOD
6 Claims, 6 Drawing Figs.

[52] U.S. Cl. ..................................................... 31/89
[51] Int. Cl. ............................................... A01j 25/00
[50] Field of Search ......................................... 31/89, 46, 47, 48

[56] References Cited
UNITED STATES PATENTS

| | | | |
|---|---|---|---|
| 1,475,398 | 11/1923 | Kielsmeier | 31/47 |
| 2,536,054 | 1/1951 | Harrington | 31/48 |
| 3,193,927 | 7/1965 | Ubbels et al. | 31/46 |
| 3,292,259 | 12/1966 | Lambert et al. | 31/48 |

*Primary Examiner*—Hugh R. Chamblee
*Attorneys*—John W. Michael, Gerrit D. Foster, Bayard H. Michael, Paul R. Puerner, Joseph A. Gemignani, Andrew O. Riteris and Spencer B. Michael

ABSTRACT: Prepared whey and curd are transferred to the cheddaring machine to place the curd in the perforate downwardly diverging annular screen enclosure within the vat (FIG. 1). The screen is rotated and a mixer keeps the curd moving upwardly to obtain uniform dispersion of the curd and facilitate removal of air and gases. After filling the mixer is removed and whey drained while rotation continues at a slower rate. The vat is tilted (FIG. 2) so the now-knitting curd is manipulated to aid whey expulsion and work the cheese as required in cheddaring. Tilting to the FIG. 3 position compresses the curd previously on the upper surface and knits the curd while the converging annulus further compresses and works the curd. Finally (FIG. 4) the ring closure is pulled back and a knife fixed across the opening to cut the curd as it moves down and out. By reason of the rotation of the screen the curd comes out in a continuous ribbon for conveyance to further process stations.

Inventor
Dayle D. Winnie
By Bayard H. Michael
Attorney

Inventor
Dayle D. Winnie
By Bryan H. Michael
Attorney

Inventor
Dayle D. Winnie
By Bayard H. Michael
Attorney

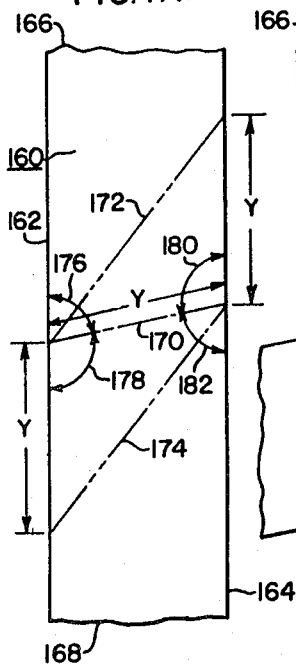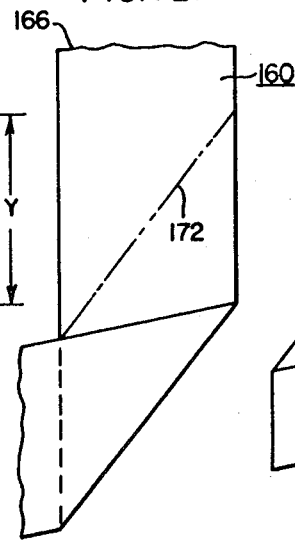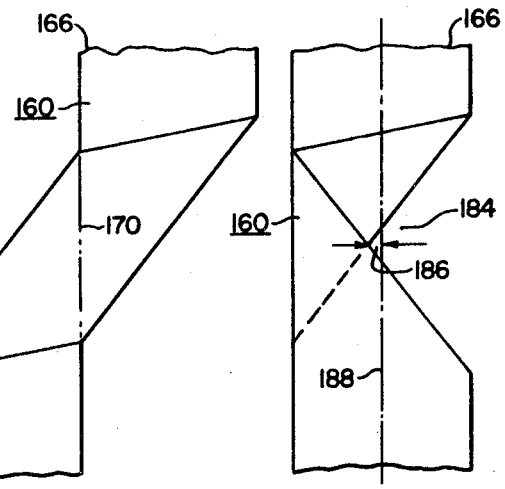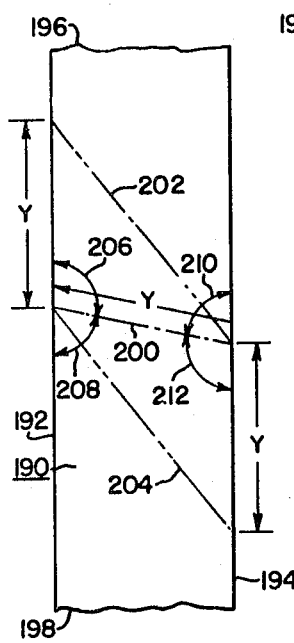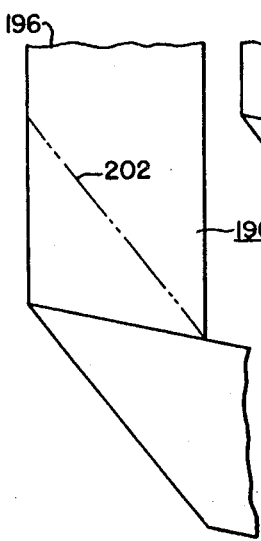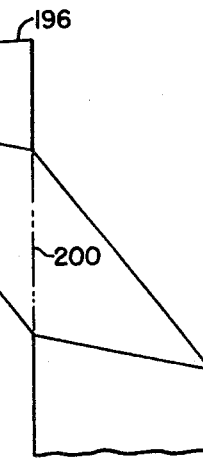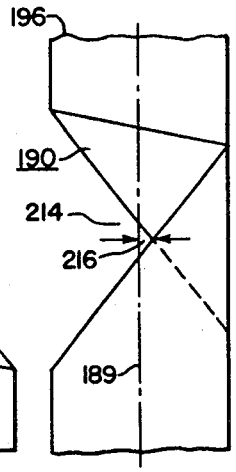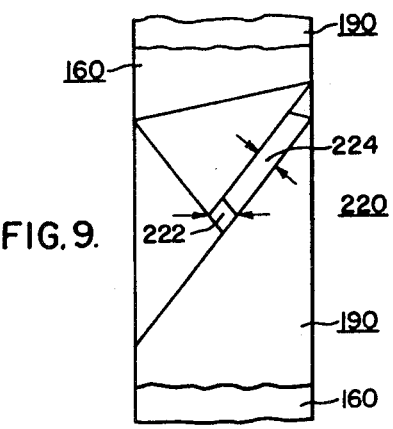

3,633,276

CHEESE CHEDDARING METHOD

CROSS-REFERENCE TO RELATED APPLICATION

This application is a division of my application, Ser. No. 749,365, filed Aug. 1, 1968, which is directed to the apparatus.

BACKGROUND OF INVENTION

In the cheddar cheesemaking process the cheddaring step itself is the most laborious. This step follows preparation of the curd and traditionally the cheddaring step is carried out in the same vat as employed in preparing the curd. After the curd has been prepared the whey is drained and the curd particles tend to knit together. The curd is cut into slabs about 8 to 12 inches wide and 2½ feet long and usually 6 to 8 inches thick at the start of the cheddaring step. For the ensuing period of 1½ to 2 hours these slabs are turned over by hand repeatedly and, as they tend to thin out, are piled on top of each other, two, three or four slabs high. The piled slabs tend to knit together and each time they are turned they must be pulled apart. This is quite difficult work and in larger cheese plants there is a constant push to increase the size of the vats and this, in turn, has increased the problem of handling the slabs during the cheddaring step. To avoid the problem of reaching over high vat sides some plants have tried to partially solve the problem by pumping the whey and curd to a shallower vat for the cheddaring step, merely to bring the slabs to a more convenient worker height permitting the worker to stand more erect. While this somewhat alleviates the problem it does not eliminate the strenuous manual labor involved nor does it reduce the amount of hand labor involved.

There have been some efforts to produce machines which will take over the cheddaring step but there was a reduction in quality of the cheese along with reduction of labor. The present machine eliminates the manual labor involved in the cheddaring step without any sacrifice in the quality of the end product. The process is not to be confused with those which, in effect, bypass the cheddaring step and do not produce cheddared cheese.

SUMMARY OF INVENTION

Reference is made to the abstract of the present disclosure describing the broad aspects of the machine and process. By way of elaborating on that description it is emphasized that experience to date indicates that it is important to both rotate the screen enclosure and to provide agitation during the filling process. This is important both to achieve a uniform filling within the enclosure and to expel air and trapped gases. Without the agitation gaslike openings in the end product will result while the desired cheddar cheese has a nearly solid structure. Possibly the agitation could be supplemented by or replaced by application of a partial vacuum during the filling step. The ability to tip the vat and the rotating screen enclosure therewithin is a key factor in the present construction in that it insures manipulation of the knitting curd in such a manner that the resulting product is virtually the same as that produced by the best of the traditional method. Indeed, it has the advantage of not being dependent upon the human element. A further important feature of the invention is the ability to discharge the curd from the machine in a continuous ribbon which lends itself to further processing by automated equipment.

With the present equipment the hand labor is removed from the cheddaring step and whereas it was previously necessary to have one worker per vat during the cheddaring step it is contemplated that with this equipment one worker can handle six machines. Furthermore, early indications are that the cheese produced by this machine is at least equal to that produced by the traditional hand method at its best. There is also some thought that the cheddaring time is reduced with the machine in that the desired breast-of-chicken consistency of the curd and acidity apparently are reached sooner than in the traditional method.

DESCRIPTION OF PREFERRED EMBODIMENT

Figure 1:
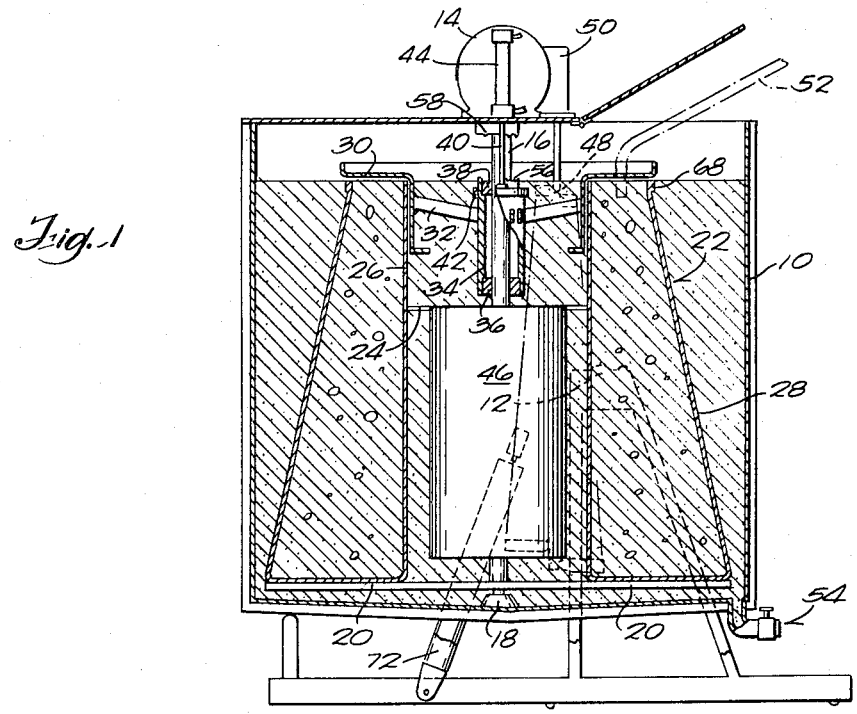
FIG. 1 is a vertical section through the vat during the filling process.
Figure 5:
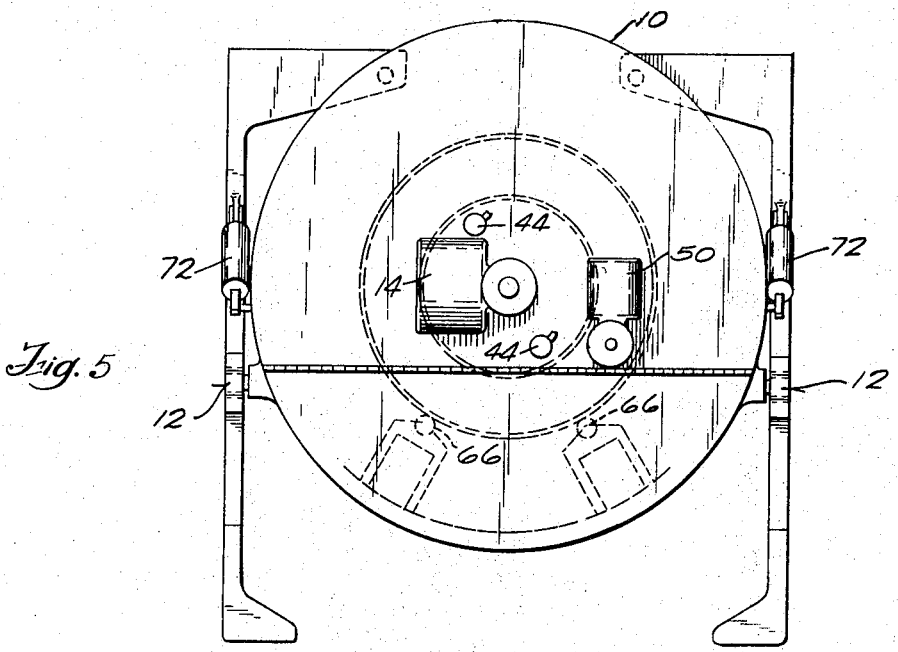
FIG. 5 is generally a top view of FIG. 1.
Figure 6:
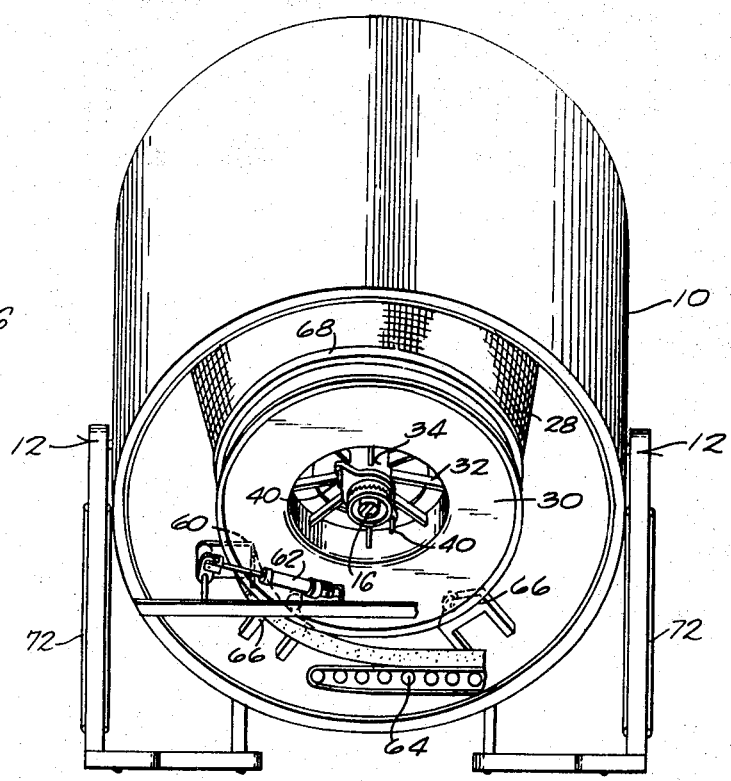
FIG. 6 is an end view of the vat in the discharge position corresponding to FIG. 4.
Figure 13A:
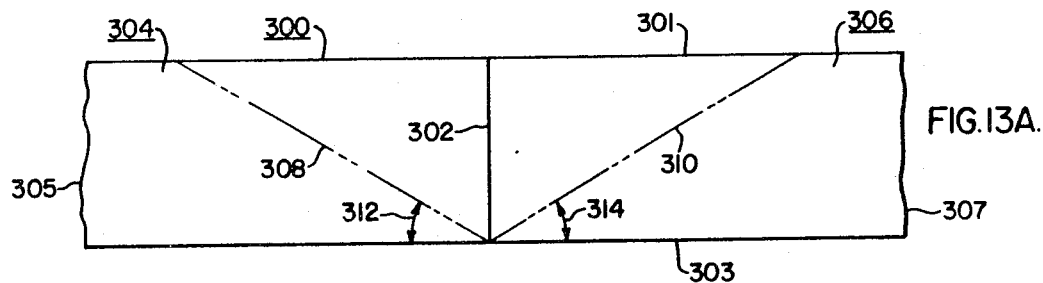
Figure 13B:
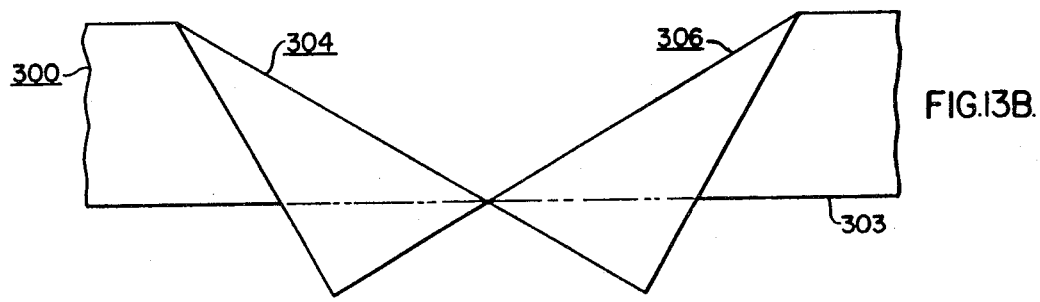
Figure 13C:
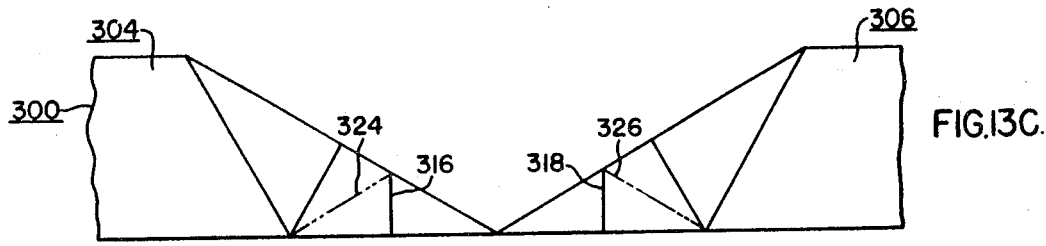
Figure 13D:
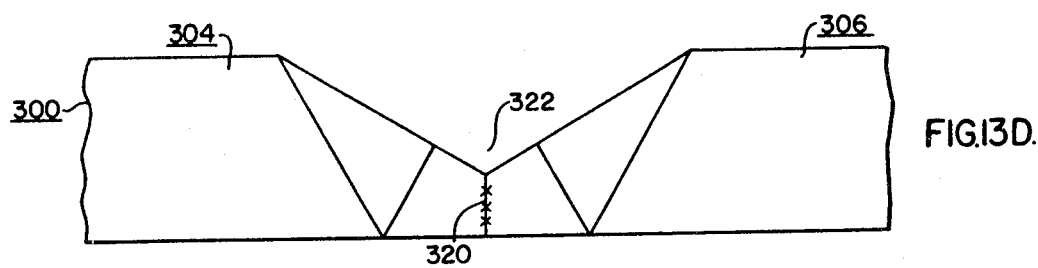
Figure 13E:
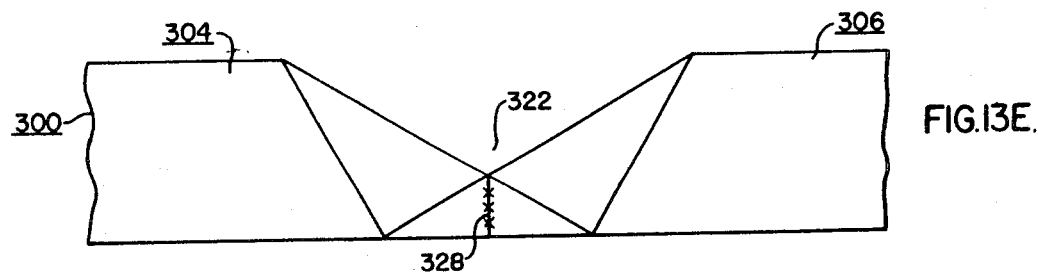

Referring to the drawings in detail, as may be seen in FIGS. 1 and 5, the vat 10 is journaled at 12 to be tilted about a horizontal axis but in the initial operation of the machine the vat is positioned vertically as in FIG. 1. Mounted on top of the vat there is a motor 14 which drives shaft 16 journaled at the bottom of the vat in a radial and thrust bearing 18. The shaft has radial bars 20 at its lower end to drive and support the screen enclosure 22 which is also supported by the radially extending rods 24 connected to the inside wall 26 of the screen 22. The outside wall 28 of the screen enclosure converges upwardly and inwardly in a frustoconical manner. The open, upper end of the screen enclosure may be closed by the axially movable platen or end plate 30 which is supported on arms 32 projecting from sleeve 34 which carries bearings 36, 38 slidable on the central shaft 16 and controlled by the piston rods 40 connected to collar 42. The piston rods project form the hydraulic cylinders 44 and control the up and down movement of the platen. The inside of the platen has the depending skirt portion to which the arms 32 are connected and the skirt tends to guide the platen in addition to the platen being guided by the bearings 36, 38. The lower portion of the shaft carries an empty drum 46 which is used strictly to fill a space.

As shown in FIG. 1, platen 30 has been moved slightly out of engagement with the upper or open end of the screen enclosure 22 to allow the platen to remain stationary and allow insertion of the agitator 48 from above into the space between the inner and outer walls 26, 28 of the screen enclosure. This agitator comprises a central shaft with paddles projecting at 180° apart so as to lie in one plane and permit insertion through the relatively narrow upper end and yet, when rotated, sweep quite close to the inside and outside walls of the screen enclosure. The paddles are pitched so as to induce an upward and downward motion of the curd and whey. The agitator is driven by motor 50 carried by the stationary frame and the motor drive constitutes the support for the agitator and provides adequate bearing and guidance for the agitator, the lower end being unguided. Also when the platen is slightly retracted as shown in FIG. 1, the fill pipe 52 can be inserted through a suitable access port in the platen for introduction of the prepared curd and whey into the screen enclosure. During this time the entire screen enclosure is being rotated and this passes the screen under the fill pipe so as to achieve uniform filling. Since the knitting process is not desirably started until all the curd has been introduced the agitator is employed to keep the batch stirred up. During the filling process the drain valve 54 is closed. During the filling stage the screen enclosure is rotated about one revolution per minute. After filling has been completed, drain valve 54 is opened and the whey starts draining off. Rotation of the screen enclosure continues during this time.

Figure 2:
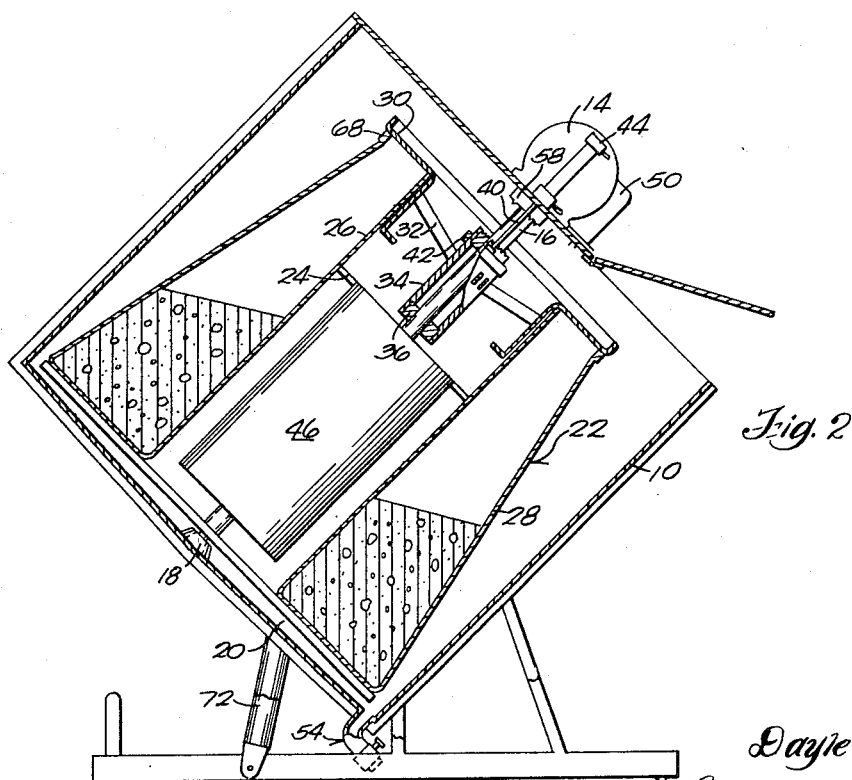
FIG. 2 shows the vat tilted after the whey has been drained off.
Figure 3:
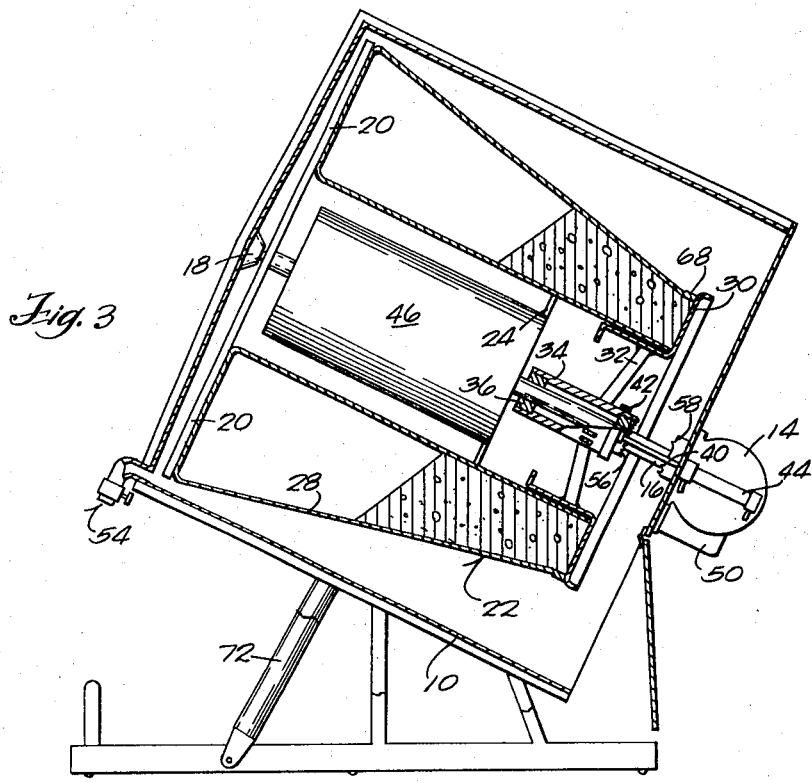
In FIG. 3 the vat has been tilted even further.

After the majority of the whey has been drained off, the curd will have settled down in the wider portion of the screen enclosure and at this time the rate of rotation can be reduced to approximately 1/6 r.p.m. and the drum is tilted to the position shown in FIG. 2. By way of illustrating what is involved here, the vat is dimensioned to contain all the curd produced by 30,000 pounds of milk. After the whey has been drained, the weight of the curd remaining in the machine is approximately 3,000 pounds. When the rotation continues in the position shown in FIG. 2, it will be appreciated that the annulus of curd which is now knitting together would tend to move towards the lowermost point. Therefore, that point is in compression with the top and sides of the annulus in tension. Of course, each portion of the annulus will be alternately compressed and tensioned by this process and, therefore, the knitting curd is manipulated in a way which closely simulates the hand labor process. While in the tilted position of FIG. 2, the platen is preferably seated against the top of the screen enclosure and now rotates with the screen enclosure. It will be appreciated that the perforations in the screen enclosure afford a gripping surface for the knit mass to engage and thus keep the knit mass rotating with the screen enclosure. During this stage of the cheddaring process the upper surface of the knit mass will tend to become somewhat crumbly and will tend to fracture. Later in the cheddaring process the vat is rotated to the position shown in FIG. 3. Now the knit mass tends to work towards the platen and that portion which formerly was relatively free (on the top in FIG. 2) is now forced into a converging space and against the end platen and, hence, is now placed into compression and, by reason of the rotation, will also be alternately compressed and tensioned. Therefore, the knit mass which might have otherwise become too crumbly is now worked in the normal manner and the whey between the particles is expelled as they knit together.

Figure 4:
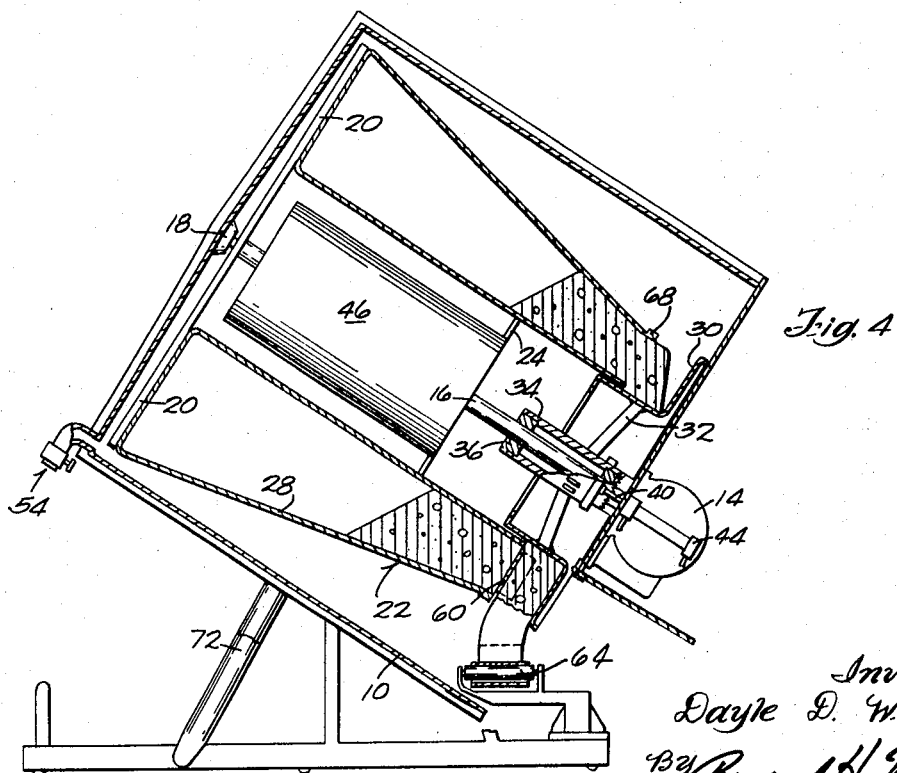
In FIG. 4 the vat has been tilted to the discharge position.

When the cheese has achieved the desired breast-of-chicken characteristic indicative of the completion of the cheddaring process the hydraulic cylinder 44 is actuated to pull the platen away from the open end of the screen enclosure. The upper end of the sleeve 34 is serrated as indicated at 56 to engage the serrated teeth 58 on the collar on the drive shaft. This operates as a clutch and insures rotation of the platen with the screen enclosure so that as the curd comes up against the platen it has additional frictional engagement and slippage of the curd relative to the screen enclosure is minimized. Also when the platen is withdrawn as illustrated in FIG. 4, the drum is tilted even further to force the curd firmly through the converging space. Immediately upon opening the platen a knife 60 is moved across the opening by hydraulic ram 62 so that as the curd starts coming out of the open end of the screen enclosure the knife will carve off a continuous ribbon of cheese which will fall on the conveyor 64 as illustrated in FIG. 4. The speed of rotation of the enclosure may be adjusted at this point to match the discharge of the cheese ribbon to the conveyor speed which is somewhat dictated by the subsequent processing station requirements. The speed of rotation should not be so great as to result in too thin a ribbon, however.

Several additional points should be mentioned. It will be noted the outer end of the screen enclosure is provided with a reinforcing rim 68 which rolls on rollers 70 which provide a suitable bearing. Tilting of the vat is controlled by hydraulic ram 72 which is connected to the drum at a point spaced from the bearings 12 to achieve proper lever arm. No effort has been made to show the internal piping which can be provided for cleaning the apparatus in place after production of the cheddar.

The continuous stretching and compressing accomplished by this machine is very similar to that accomplished in the conventional hand process. The whey is worked out from between the curd particles in a manner very similar to the hand process. Since all of the process is not dependent upon when the worker decides to turn a slab the results are of uniform high quality. The ability to tip the machine so as to work all portions of the knitting curd mass is of considerable importance. The converging annulus afforded by the configuration of the screen enclosure prevents breaking up of the curd and additionally helps prevent slippage of the curd mass relative to the screen enclosure which, of course, would eliminate the benefit of the manipulation induced by the machine.

I claim:
1. The method of cheddaring cheese comprising the steps of:
   1. pumping curd and whey into an annular, perforate cylinder, contained in a vat,
   2. draining the whey from the curd,
   3. rotating the cylinder about an inclined axis whereby the knitting annular curd is subjected to alternate compression and tension as the cylinder rotates,
   4. inclining the cylinder in the opposite sense to move the curd to the other end of the cylinder,
   5. continuing to rotate the cylinder to subject the curd to continued compression and tension,
   6. discharging the curd from one end of the cylinder while rotation continues.

2. The method of claim 1 in which the annular cylinder generally converges towards one end and the curd is discharged from the smaller end whereby further compression is achieved.

3. The method according to claim 2 in which the first angle of inclination positions the curd adjacent the larger end of the generally annular cylinder and the second inclination causes the curd to move towards the smaller end of the generally annular cylinder.

4. The method according to claim 1 in which the rotation is continued until the curd achieves the "breast-of-chicken" texture.

5. The method of cheddaring cheese comprising the steps of:
   1. placing the curd and whey in an annular perforate container contained in a vat,
   2. draining the whey while confining the curd to an annular shape,
   3. inclining the annular container and rotating the container about the inclined axis of the annulus to place the knitting curd in compression and tension as it passes through the low and high points of rotation,
   4. inclining the annular container in the opposite sense to place the previously upper end of the annulus on the lower end while continuing the rotation about the axis of the annulus,
   5. continuing the rotation until the curd reaches the "breast-of-chicken" texture,
   6. discharging the curd from the container for further processing.

6. The method of claim 5 including the steps of rotating the curd while discharging it from one end of the container and causing the rotating curd coming from the container to engage a knife to slice the curd into a ribbonlike strip.

* * * * *

UNITED STATES PATENT OFFICE
CERTIFICATE OF CORRECTION

Patent No. 3,633,276      Dated January 11, 1972

Inventor(s) Dayle D. Winnie

It is certified that error appears in the above-identified patent and that said Letters Patent are hereby corrected as shown below:

In the drawings, sheets 4 and 5 should be cancelled.

Signed and sealed this 7th day of November 1972.

(SEAL)
Attest:

EDWARD M. FLETCHER, JR.      ROBERT GOTTSCHALK
Attesting Officer      Commissioner of Patents